United States Patent [19]

Odagiri et al.

[11] Patent Number: 5,905,460
[45] Date of Patent: May 18, 1999

[54] WRIST WATCH TYPE GPS RECEIVER

[75] Inventors: Hiroshi Odagiri; Keisuke Tsubata; Takeshi Oono; Kazumi Sakumoto; Chiaki Nakamura, all of Chiba, Japan

[73] Assignee: Seiko Instruments Inc., Japan

[21] Appl. No.: 08/918,200

[22] Filed: Aug. 25, 1997

[51] Int. Cl.$^6$ ....................................................... G01S 5/02
[52] U.S. Cl. .......................................... 342/357; 701/213
[58] Field of Search .................................... 342/357, 352; 701/213

[56] References Cited

U.S. PATENT DOCUMENTS

| 5,345,244 | 9/1994 | Gildea et al. | 342/357 |
| 5,627,548 | 5/1997 | Woo et al. | 342/357 |
| 5,731,757 | 3/1998 | Layson, Jr. | 340/573 |

*Primary Examiner*—Mark Hellner
*Attorney, Agent, or Firm*—Adams & Wilks

[57] ABSTRACT

The system includes an antenna posture detecting device for detecting an antenna posture condition where it is apparently impossible to receive the wave, and a received signal operation controlling device for temporarily interrupting the wave receiving operation, in the case where it is impossible for the antenna to receive the wave, until the wave receiving operation is again possible. The system may include a body movement detecting device for detecting an action of the user; an action judgement device for judging the action of the user on the basis of an output signal of the body movement detecting device; a signal receiving operation controlling device for controlling a signal receiving operation of the GPS receiving device from the judgement result of the action judgement device; a moving distance calculating device for calculating a moving distance of the user on the basis of an output signal of the body movement detecting device during a period of time when the GPS signal receiving operation is interrupted; and an alarm device for receiving a wave of a GPS receiving antenna on the basis of an output signal of the moving distance calculating device and for giving an alarm to the user for a position where it is easy for the GPS receiving antenna to receive the wave.

17 Claims, 10 Drawing Sheets

WRIST WATCH TYPE GPS RECEIVER

BACKGROUND OF THE INVENTION

The present invention relates to a GPS (Global Positioning System, worldwide positioning system) device for receiving waves from a GPS satellite and measuring the position of the receiver and the moving speed. More particularly, the present invention relates to a wrist watch type GPS device which may be maintained and mounted on the a wrist of a human being for measuring his or her position and moving direction.

Conventionally, in a GPS receiver, as shown in FIG. 6, a GPS wave 61 emitted from a GPS satellite is received in the GPS receiver 62, the signal is processed at a high speed in a GPS received signal processing means 63 such as a frequency calculator, an orbit information calculator section or the like, and, as a result, the obtained measured data is displayed on a GPS data display means 64. If it is considered that such a GPS receiver is worn on the wrist, a receiving posture or position of an antenna becomes a problem. A conventional technology to keep the posture of the antenna in a constant position is shown in FIG. 7. In the prior art shown in FIG. 7, an antenna portion 71 and an operating section 72 may be integrally connected to each other by a support member 74 having a wave receiving surface 73 of the antenna portion 71 supported rotatably within a predetermined angle relative to a horizontal surface H, and, at the same time, the gravity position of the antenna portion 71 may be measured downwardly in the vertical direction below the rotational center of the gravity position of the antenna portion 71. Also, a weight (balancer) 75 is provided below the antenna portion 71, so that the antenna portion 71 is normally kept in the horizontal direction to thereby keep the antenna position where the wave may normally be received. Such a conventional example is shown in Japanese Patent Laid-Open Application No. Hei 4-359179.

In general, in view of the fact that the angle of elevation of the antenna at which a signal may be received is 15 device or more relative to the horizontal surface, the position of the antenna when the wrist watch type GPS receiver is realized becomes a serious problem. In the case where the GPS antenna is arranged on the surface that is flush with the display means of the GPS receiver, when the GPS receiver is portable with the wrist in a natural posture, the GPS receiver takes an antenna posture in which the GPS receiving is impossible. The fact that the normal signal receiving operation is performed in such an antenna posture where the wave cannot definitely be received increases the power consumption rate. In particular, a high speed calculation process is required in the GPS received signal processing means of the GPS receiver, and an orbit calculating device having a very high speed processing ability is also required, resulting in an increase in power consumption. The fact that the operation of the GPS received signal processing means is continued for the antenna posture in which the wave cannot definitely be received leads to a large loss. On the other hand, there has been proposed a method for keeping the antenna posture in a constant position when the GPS signal is received. However, in order to keep the posture in a constant position, it is very difficult to use the device.

SUMMARY OF THE INVENTION

It is an object of the invention to provide a system which reduces a power consumption of a wrist watch type GPS receiver by reducing a waste power consumption without adversely affecting to the usage of the device.

It is another object of the invention to provide a wrist type GPS receiver for reducing the power consumption caused by the wasteful measurement operation when the wave cannot be received.

It is a further object of the invention to provide a system which enhances the reliability of the display of the data.

It is a further object of the invention to provide a wrist type GPS receiver reducing the power consumption by preventing a waste measurement operation when the user takes a motion.

DETAILED DESCRIPTION OF THE INVENTION

Figure 1:
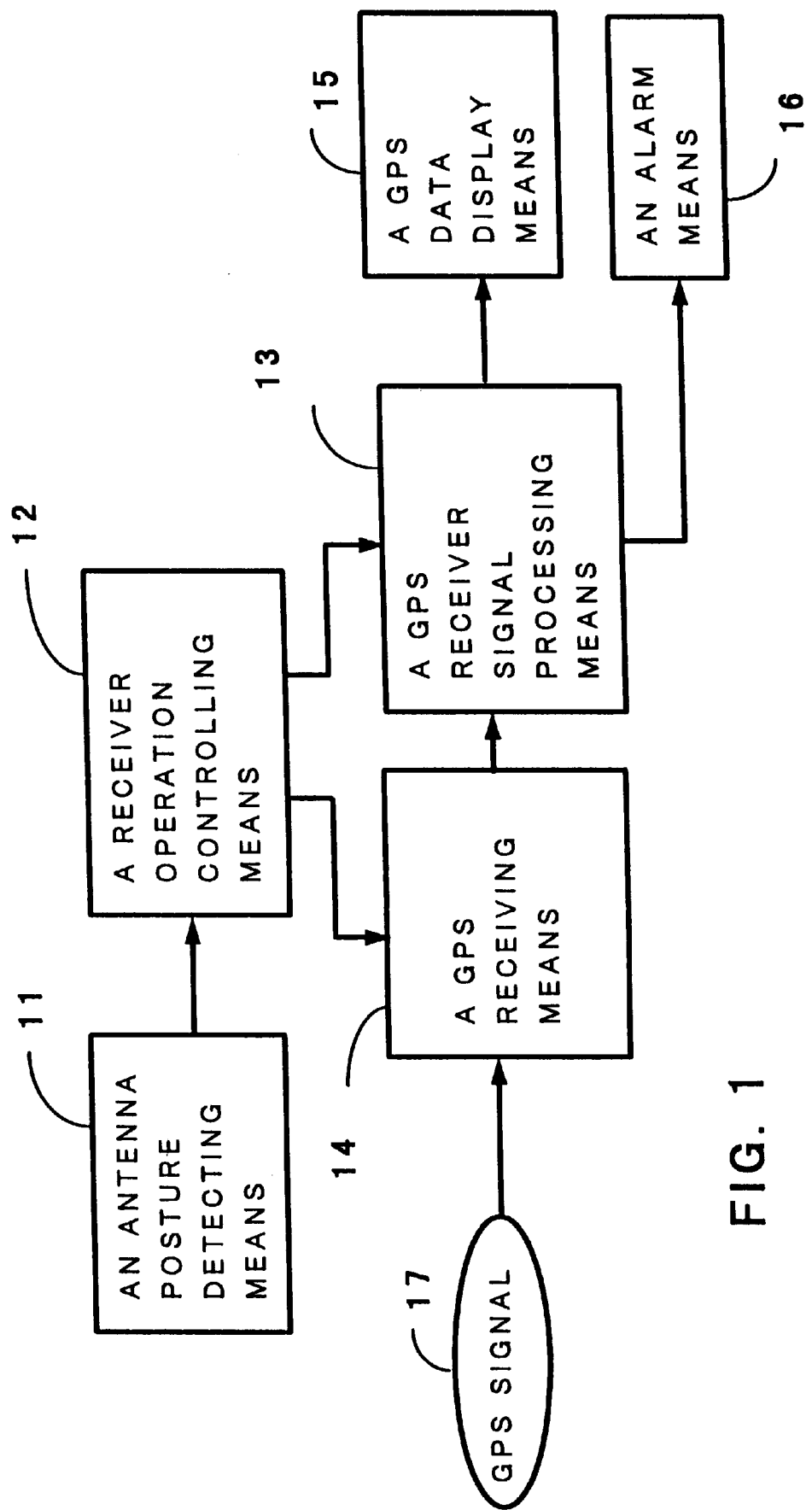
FIG. 1 is a functional block diagram showing a structure of a wrist watch type GPS receiver according to the present invention.

In order to solve the above-noted defects, a GPS receiving device according to the present invention is characterized by including an antenna posture detecting means for detecting antenna posture conditions at which it is impossible to receive the GPS wave and at which it is possible to receive the GPS wave, a GPS wave receiving operation controlling means for temporarily interrupting the wave receiving operation until the wave receiving operation is again possible in the case where it is impossible for the antenna to receive the wave, a GPS receiving means for receiving the GPS wave and whose receiving operation is controlled in accordance with an output of the GPS wave receiving operation controlling means, a received GPS signal processing means whose received signal is processed on the basis of the output of the GPS receiving means, and GPS data display means for displaying GPS information outputted from the received GPS signal processing means. Accordingly, the present invention a structure for reducing power consumption caused by the performance of a wasteful measurement operation when the GPS wave cannot be received. Furthermore, the operation of the GPS wave receiving operation controlling means for preventing the temporary measurement is interrupted for a constant period of time to thereby enhance the reliability of the display of the data. In the case where it is apparent that the posture of the signal reception and the posture of the display are different from each other like the wrist watch type GPS receiver shown in FIG. 8, an alarm is given after the measurement in order to confirm the display of the completion of the measurement operation without indication of the display.

In addition to the above-described method to save the power consumption by interrupting the operation of the GPS signal receiving means as a result of the posture detecting of the antenna, it is also possible to provide a method for attaining the same object by interrupting the operation of the GPS signal receiving means during the user's movement by detecting the movement condition of the user. The system is characterized by including a body movement detecting means for detecting movement (walking or running) of the user; movement judgement means for judging the movement of the user on the basis of an output signal of the body movement detecting means; a signal receiving operation controlling means for controlling a signal receiving operation of the GPS receiving means based on the judgement result of the movement judgement means; a moving distance calculating means for calculating a moving distance of the user on the basis of an output signal of the body movement detecting means during a period of time when the GPS signal receiving operation is interrupted; and an alarm means for providing an alarm to the user for a position where it is easy for the GPS receiving antenna to receive the wave. Thus, the performance of a wasteful measurement operation is prevented to thereby save power when the user is walking or running.

FIG. 1 is a functional block diagram showing a structure of a wrist watch type GPS receiver according to a first embodiment. In FIG. 1, an antenna posture detecting means 11 detects a wave receiving posture and a receiver operation controlling means 12 judges whether or not the receiving condition of the antenna is possible. The receiver operation controlling means 12 controls a GPS receiving means 14 and a GPS received signal processing means 13, and prohibits the GPS receiver operation in a posture in which the wave can not be received by the antenna. In the antenna posture where the wave can be received, the GPS receiving means 14 receives a GPS wave 17. The GPS received signal processing means 13 processes the signal outputted from the GPS receiving means 14, and outputs the measured data to the GPS data display means 15. At the same time, the GPS receiving means 14 outputs a signal representing the measurement operation completion to an alarm means 16. On the basis of a signal representative of the signal processing completion from the GPS received signal processing means 13, the alarm means 16 gives the alarm to the user with respect to the completion of the position detecting operation. The GPS data display means 15 displays the GPS data outputted from the GPS receiver signal processing means 13.

Figure 2:
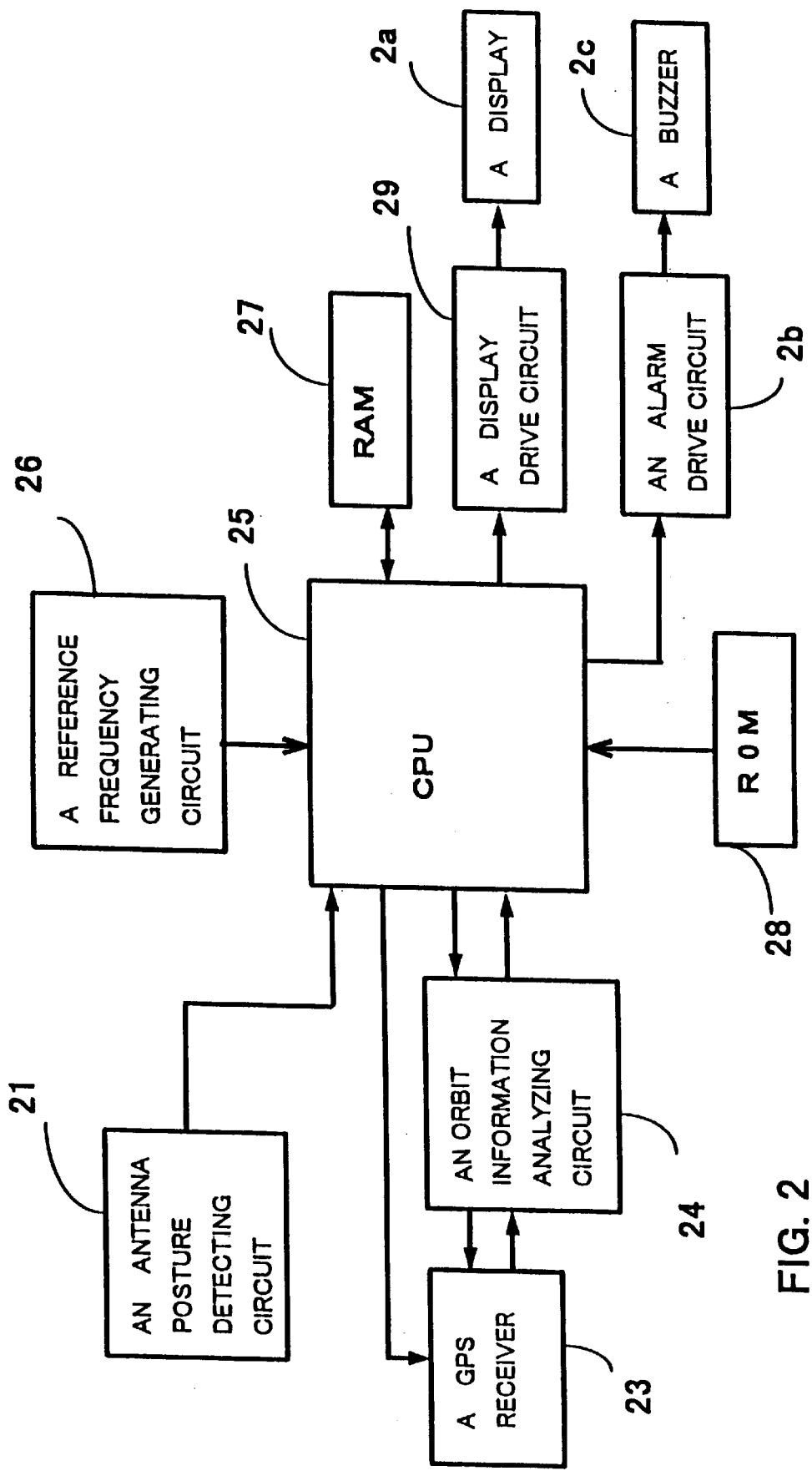
FIG. 2 is a diagram showing a specific structure of a wrist watch type GPS receiver according to the present invention.

FIG. 2 is a functional block diagram showing a specific structure. An antenna position detecting circuit 21 will be described later with reference to FIG. 3. A signal outputted from the antenna posture detecting circuit 21 is inputted into a CPU (Central Processing Unit) 25. A receiver operation controller of the CPU 25 judges whether or not the signal receiving is possible. In the case where the signal cannot be received, it turns off the GPS receiver 23 and an orbit information analyzing circuit 24. The orbit information analyzing circuit 24 is composed of a CPU having a high speed processing ability and needs a large amount of electric power. Only in the case where it is judged by the CPU 25 that the signal may be received, the GPS wave is received by the GPS receiver 23, and is processed in the orbit information analyzing circuit 24 so that the result is inputted into CPU 25. A reference frequency for the CPU 25 is produced in a reference frequency generating circuit 26, which outputs a frequency signal that is needed for each circuit. A RAM 27 stores GPS data, timing information and the like. The operation of the CPU 25 is programmed in a ROM 28. A display drive circuit 29 is a circuit for displaying the GPS data, the time and the like. A display device 2a displays the GPS data, the time and the like. An alarm drive circuit 2b is a circuit for generating a buzzer sound to drive a buzzer 2c.

Figure 3:
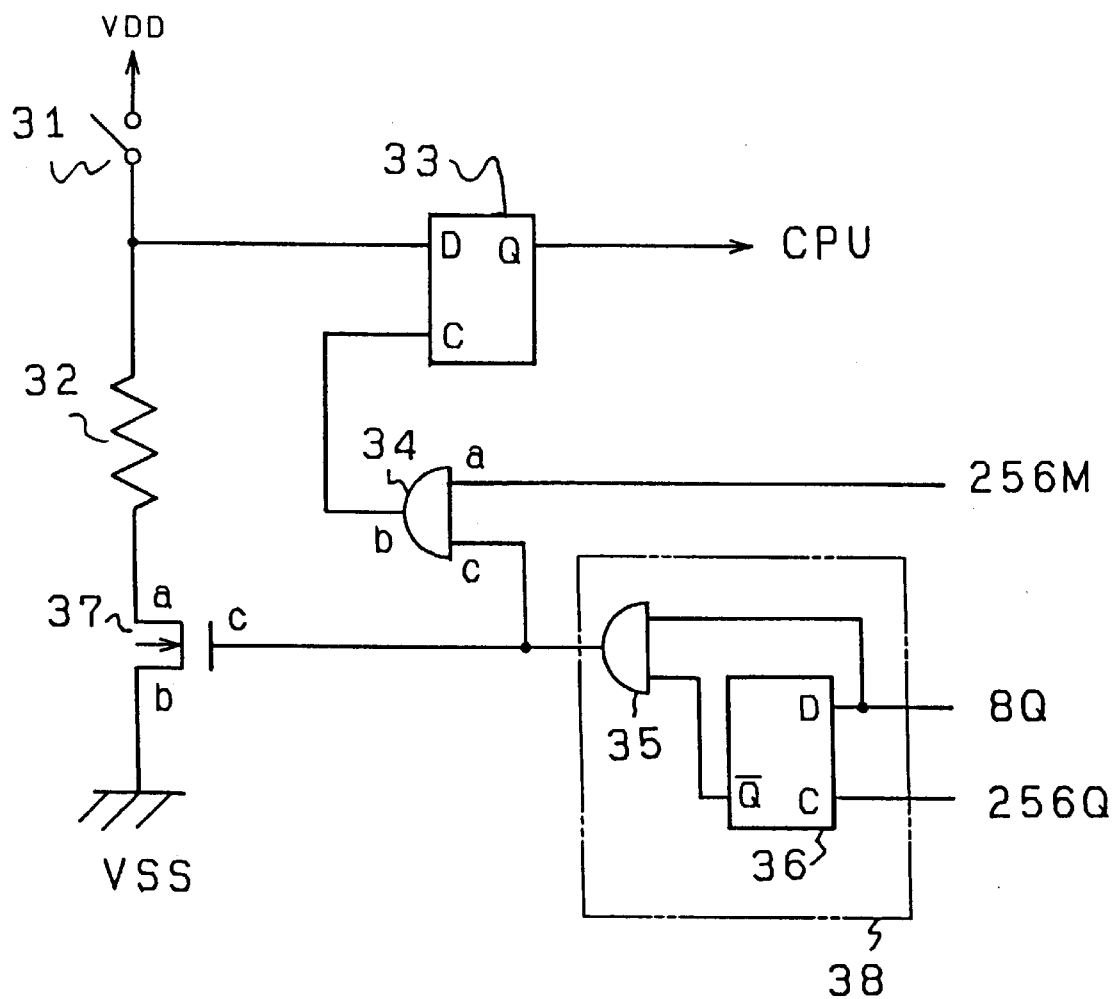
FIG. 3 is a circuit diagram showing a specific embodiment of the antenna posture detecting circuit of the wrist watch type GPS receiver according to the present invention.

FIG. 3 shows a specific embodiment of the antenna posture detecting circuit. A switch 31 is a posture detecting switch such as a mercury switch which is turned on when the signal may be received and turned off when the signal cannot be received. One of the terminals is connected to VDD and the other is connected to a posture detecting resistor 32 and a D terminal of a latch circuit 33. The other terminal of the posture detecting resistor 32 is connected to an a-terminal (drain electrode) of an N channel transistor 37. A b-terminal (source electrode) of the N channel transistor 37 is connected to VSS, and a c-terminal (gate electrode) is connected to a differential circuit 38 composed of a flip-flop circuit 36 and an AND gate 35. An output of the differential circuit 38 is further connected to an input c-terminal of the AND gate 34. An input a-terminal of the AND gate is connected to a signal of 256 HzM of the reference frequency generating circuit, and an output b-terminal of the AND gate 34 is connected to a C-terminal of the latch circuit 33 to generate a clock signal. A Q-signal of the latch circuit 33 is connected to the CPU. 8 HzQ and 256 HzZ of the reference frequency generating circuit are connected to a D-terminal and C-terminal of the flip-flop circuit 36 which constitutes the differential circuit 38.

Figure 4:
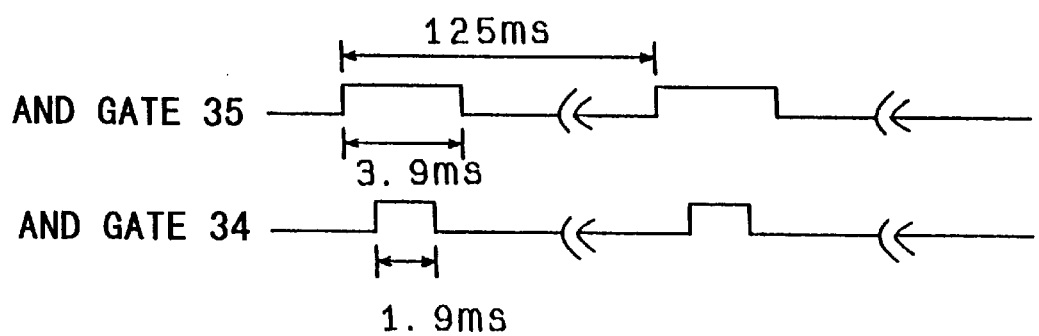
FIG. 4 is an operational timing chart showing a signal receiving operation controlling section of the wrist watch type GPS receiver according to the present invention.

Furthermore, the operation will be explained with reference to a timing chart shown in FIG. 4. A pulse having a pulse width of 3.9 msec is generated at a cycle of 125 msec in the output of the AND gate 35. According to this signal, the N channel transistor 37 is kept under the conductive state and a current flows to the posture detecting switch 31 to thereby perform the posture detection of the antenna. At this time, in the case where the posture detecting switch 31 is turned on, the potential of VDD is generated in the posture detecting resistor 32. Also, in the case where the posture detecting switch 31 is turned off, the potential of VSS is generated in the posture detecting resistor 32. This voltage is held or latched at the timing of drop of the output signal of the AND gate 34 in the latch circuit 33 to effect the interrupt in the CPU.

As a result, it is possible to detect the condition of the posture detecting switch 31 at the output signal (125 ms interval) of the AND gate 35. Thus, it is possible to save the electric power to be consumed in the posture detection.

Figure 5:
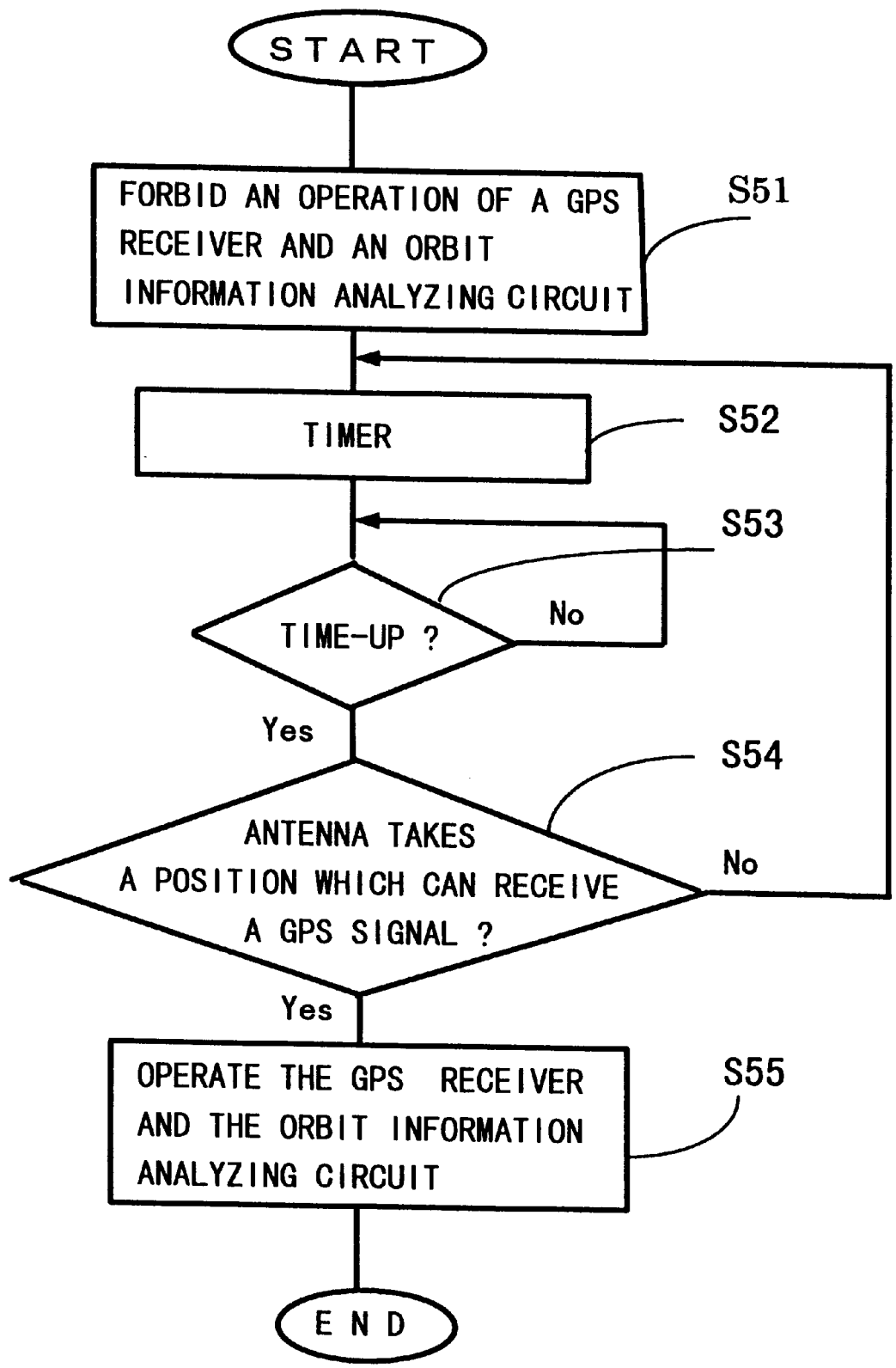
FIG. 5 is a flowchart for illustrating the operation of the signal receiving operation controlling section of the wrist watch type GPS receiver according to the present invention.
Figure 6:
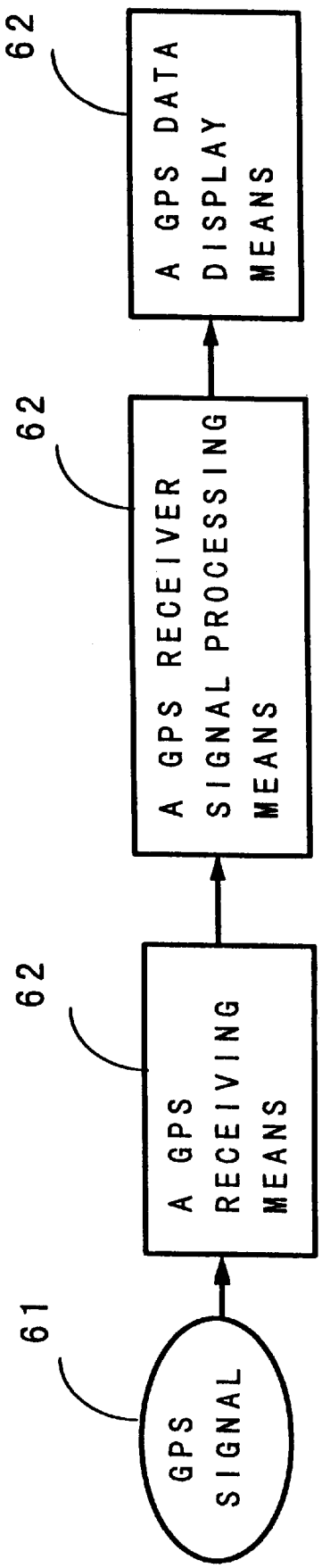
FIG. 6 is a functional block diagram showing a structure of a GPS receiver according to the prior art.
Figure 7:
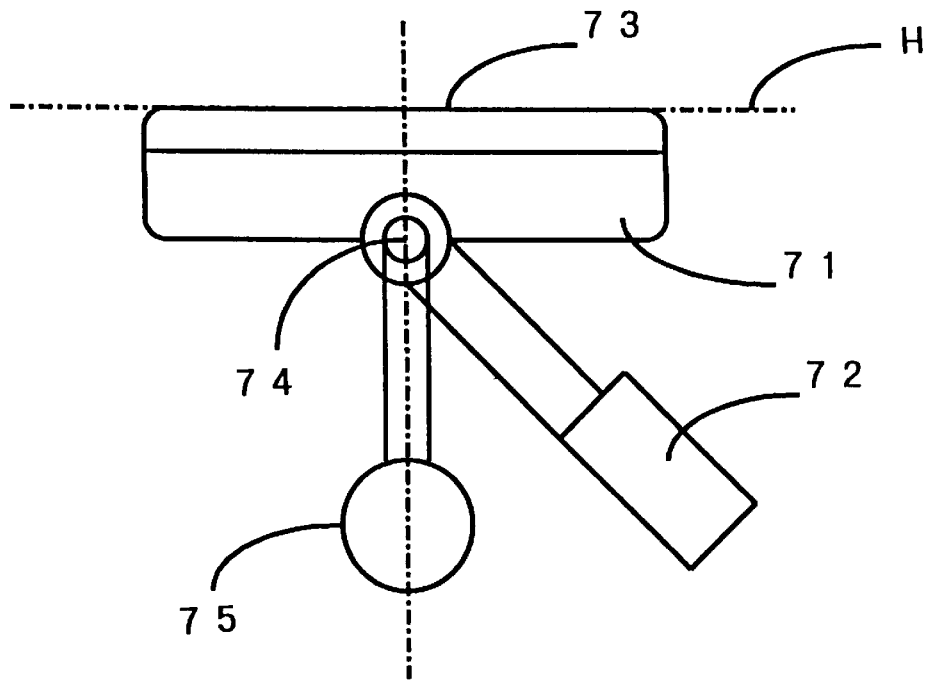
FIG. 7 is a view showing one example of the conventional GPS antenna.

FIG. 5 shows an operational flow in which the CPU 25 prevents the operation of the orbit information analyzing circuit 24 and/or the GPS receiver 23 in accordance with the output signal of the antenna posture detecting circuit 21. When the output signal of the antenna posture detecting circuit 21 detects a posture in which the position detecting operation of the antenna is impossible, an interrupt signal is input to the CPU 25. Thereafter, immediately, the CPU 25 prevents the operation of the GPS receiver 23 and the orbit information analyzing circuit 24 (S51). Thereafter, a timer for a certain constant period of time is started (S52). Immediately after the time-up of the timer (S53), the CPU checks the output of the antenna posture detecting circuit 21 and judges whether or not the antenna takes the position which may be measured (S54). In the case where the posture cannot be measured, the timer is again started (S52). In the case where the posture may be measured, the CPU 25 re-operates the GPS receiver 23 and the orbit analyzing circuit 24 (S55). Upon detection of a posture that may not be measured by the antenna, by performing the above-described operation, the series of operations of the GPS receiver 23 and/or the orbit information analyzing circuit 24 is prevented, and the performance of a wasteful measurement operation is prevented for a constant period of time, to thereby save the consumption of the electric power.

Figure 8:
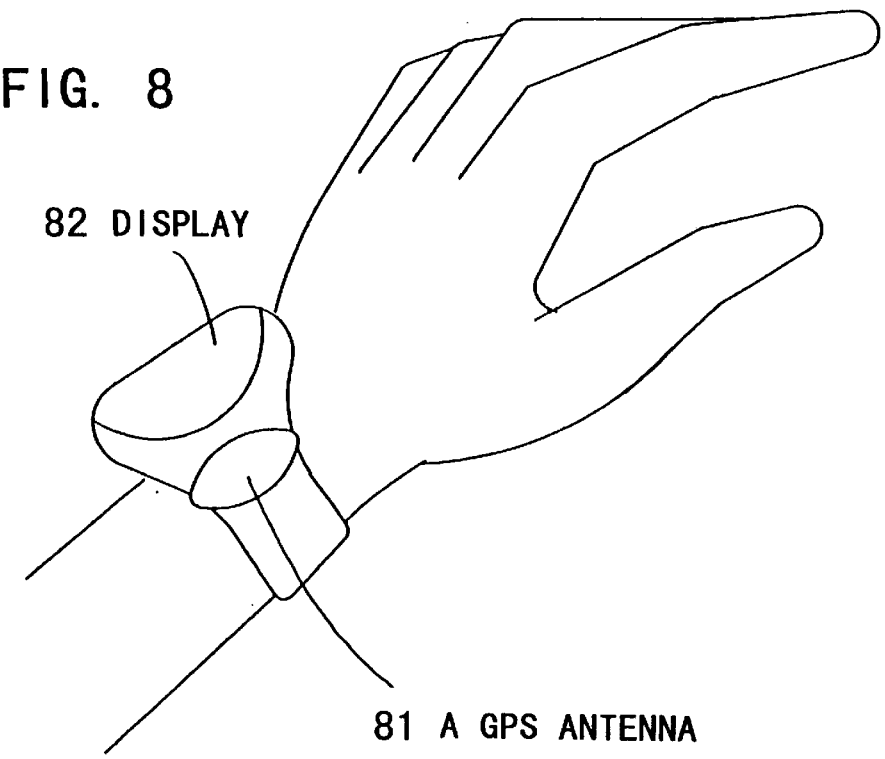
FIG. 8 is a view showing an appearance of the wrist watch type GPS receiver according to the present invention.

Also, when the position measurement operation is restarted (S55), the measurement data outputted from the orbit information analyzing circuit 24 is supplied to the CPU 25. The CPU 25 sends a signal to the alarm means 16 composed of the alarm drive circuit 2b and the buzzer 2c to give the alarm to the user of the completion of the measurement operation. By performing such an operation, by the user's action to watch the display section 82 during the position measurement operation, the antenna elevation angle of the GPS receiver antenna 81 at which the signal cannot be received is avoided. In particular, this system is available in the case where, as shown in FIG. 8, the antenna 81 is disposed on a radius bone side (on the side of 6 o'clock of the dial of a regular wrist watch) of the wrist, like the wrist watch type GPS receiver device, and the posture for receiving the wave is apparently different from the posture where the user watches the display portion 82.

Incidentally, the mercury switch or the like is exemplified as the posture detecting switch according to the embodiment for explaining the present invention. However, it is possible to use other means, for example, a combination of sensors such as a ground magnetic sensor, a gyro and the like to thereby detect the posture with higher precision. It is considered that these modifications should be included in the scope of the invention.

Figure 9:
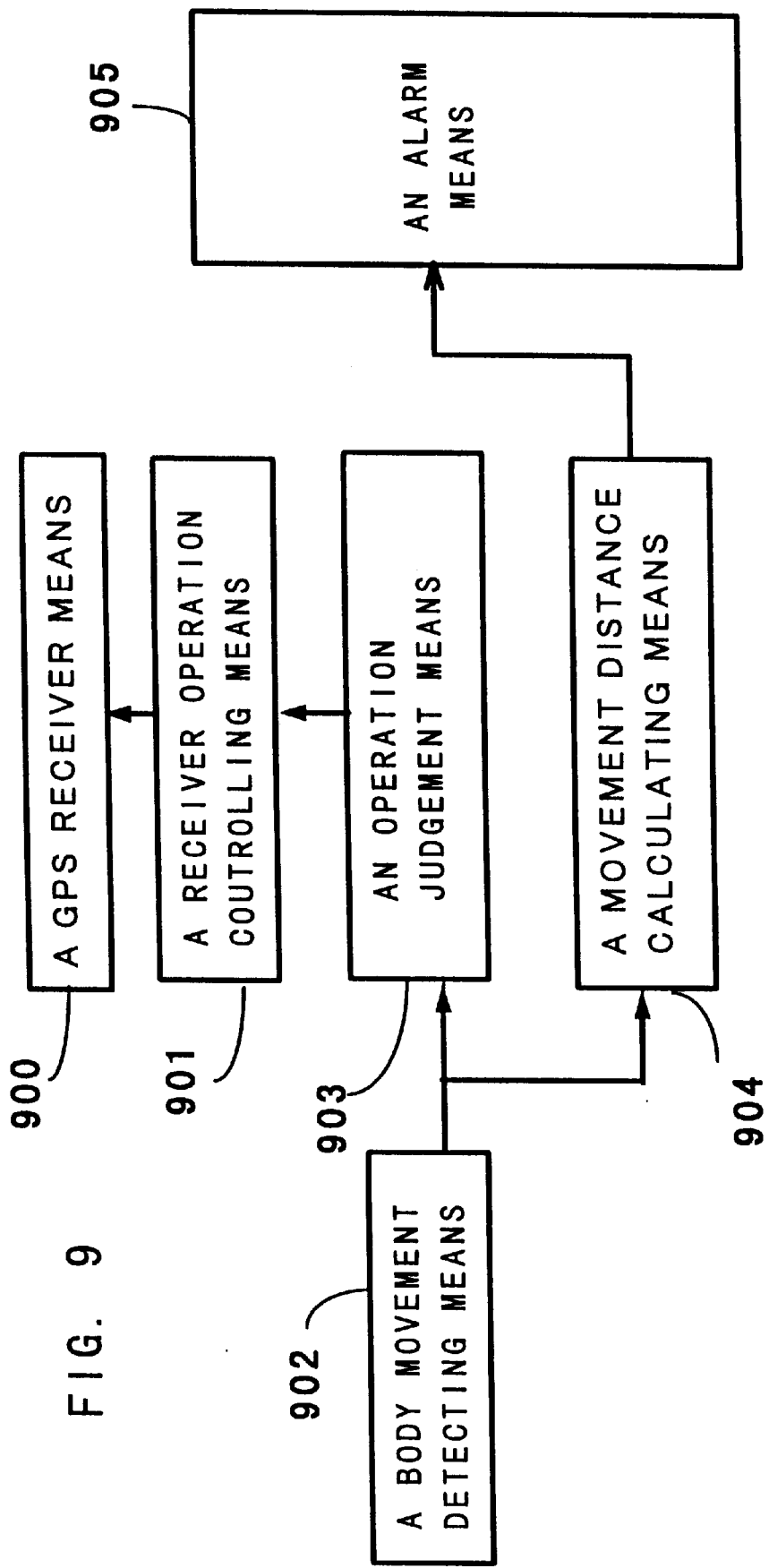
FIG. 9 is a functional block diagram showing a typical structure of a wrist watch type GPS receiver according to a second embodiment of the present invention.

Next, another embodiment of a wrist watch type GPS receiver according to the invention will now be described. FIG. 9 is a functional block diagram showing the typical structure of the present invention.

In FIG. 9, a GPS receiver means 900 has functions of those from the receiver antenna to the position measurement calculation. The receiver operation is controlled by a receiver operation controlling means 901. A body movement detecting means 902 detects the movement of the user's body and outputs a body movement signal to a movement distance calculating means 904. When it is possible to judge that the output signal of the body movement detecting means 902 represents that the user takes a walk (or movement more than a walk), an operation judgement means 903 transmits a signal representative of the fact that the user takes a movement operation. When the signal representative of the fact that the user is in the operational condition is transmitted from the operation judgement means 903, the receiver operation controlling means 901 stops the receiver operation of the GPS receiver means 900. In the same manner, the movement distance calculating means 904 calculates the movement distance of the user under the requisite that the user moves in accordance with the movement signal from the body movement detecting means 902, and transmits a signal to an alarm means 905 in the case where the movement distance exceeds a predetermined distance. If the signal representative of the fact that the user's movement distance exceeds the predetermined amount is inputted from the movement distance calculating means 904, the alarm means 905 performs the alarm to the user with respect to the GPS receiving.

Figure 10:
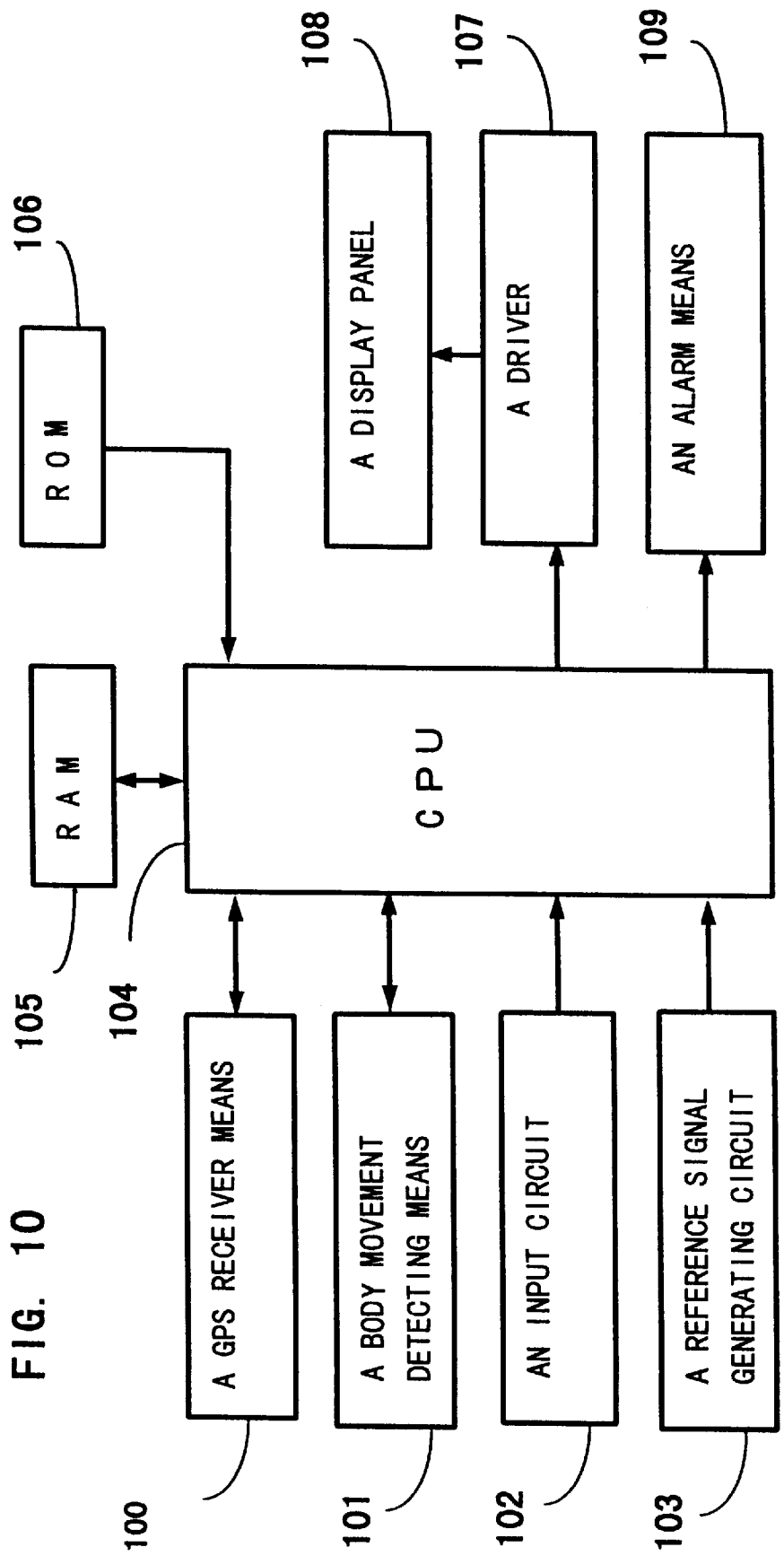
FIG. 10 is a diagram showing a specific structure of the wrist watch type GPS receiver according to the second embodiment of the present invention.

FIG. 10 is a function block diagram showing a specific structure. The GPS signal receiving means 100 has a function from a signal receiving antenna to a measured position calculation. Its signal receiving operation is controlled by the CPU 104. The GPS signal receiving means 100 outputs the measured positional data such as a position, a velocity and the like to the CPU 104. The body movement detecting device 101 is composed an accelerator sensor, a comparator or a filter circuit, an A/D converter and the like for detecting vibrations or the like that are generated when the person swings his or her arms and steps his or her feet down to the ground and for sending its signal to the CPU 104. The CPU 104 controls or manages the operation of the GPS signal receiving means 100 in accordance with the program of the ROM 106. The RAM 105 is connected to the CPU 104 as the register for the data when the CPU 104 operates and stores the target position or the like when the guide operation is performed. Numeral 102 denotes an input circuit for transmitting the input signal such as a switch signal to the CPU 104. Numeral 103 denotes a reference signal generating circuit which is composed of a CR generating circuit and the like for generating a reference frequency signal for the operation of the CPU 104 and the like to thereby output the frequency signal needed for the CPU 104. Reference numeral 107 denotes a driver for a display panel 108 for displaying a current position, a velocity and the like calculated by the CPU 104 on the display panel 108. Reference numeral 109 is an alarm device which is composed of a light, a buzzer or a vibration alarm using an ultrasonic motor.

Figure 11:
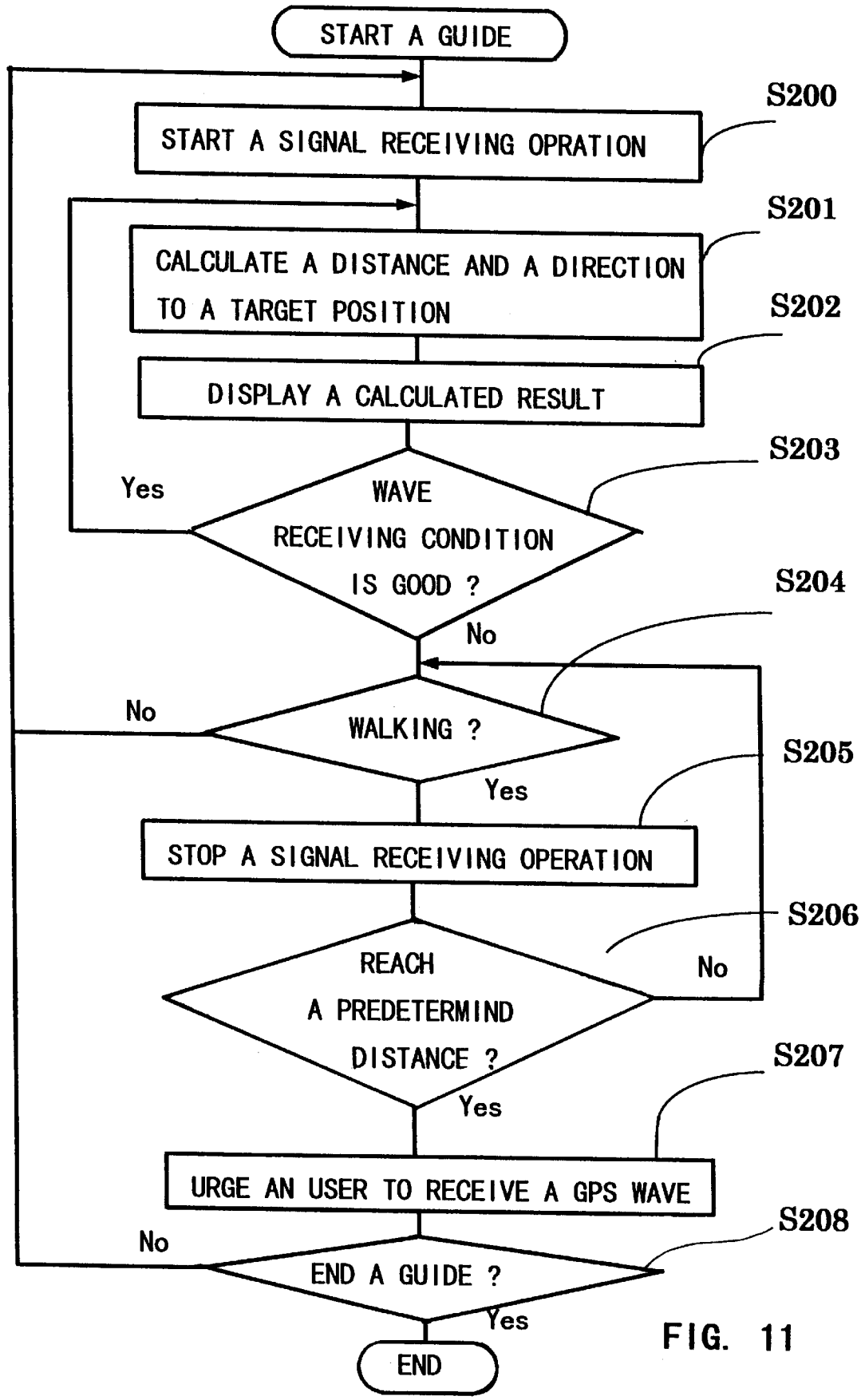
FIG. 11 is a flowchart for illustrating the operation of FIG. 10.

FIG. 11 is a flowchart for illustrating the operation of the system shown in FIG. 10 in accordance with a second embodiment of the invention and shows an operation in the case where the user is guided from a current position to a registered target position.

Before the guide operation is started, the user registers the target position. In the position which is desired to be registered, when the signal representative of the registration is sent to the CPU 104 by the input circuit 102, the CPU 104 stores the coordinates of the position in the RAM 105. Alternatively, it is possible to store the coordinate data as desired by using the input circuit 102.

At the desired position, when the signal representative of the start of the guide is fed to the CPU 104 by the input circuit 102, the GPS receiving device 100 starts the signal receiving operation (S200). When the wave is received and the current position is known, subsequently, the distance to the target position stored in the RAM 105 and the direction thereof are sought (S201). The result is displayed on the display panel 108 (S202). When the wave receiving condition is good (S203), the distance and the direction to the target position are again sought (S201). However, when the wave receiving condition is not good (S203), it is judged whether this is caused by the action of the user or not (S204). In the case where it is judged that this condition is not caused by the user's action, the wave is again received to seek the distance and the direction to the target position (S201). However, in the case where the condition is caused by the user's action, the operation for receiving the wave is temporarily stopped (S205).

The judgement as to whether the user is active or not is made by the CPU 104 based upon the signal outputted from the body movement detecting means 101. If the output signal of the body movement detecting means 101 is one that has been processed in a rectangular wave, the frequency thereof is sought to thereby judge whether the user takes a walk. Also, if the body movement signal is obtained in the form of a digital signal, the signal frequency is analyzed by the CPU 104 so that the obtained frequency, signal level and the like are used for the judgement. If the frequency is stable within a predetermined range and the signal level has no remarkable change, it is possible to judge that the user takes an action. In this case, the predetermined range of the frequency may be determined by experience. For example, if the number of the output signals from the body movement detecting means 101 is in the range of about 90 to 130 per minute and the frequency is stable, it is possible to judge that the user is walking.

When the user keeps walking while the wave receiving operation is kept under the temporary stop condition (S205) and he or she reaches a predetermined constant distance (S206), the moving direction should be confirmed or corrected. Accordingly, the alarm device 109 gives an alarm to the user to urge him or her to receive the GPS wave (S207). At the same time, since the wave receiving re-start signal is fed to the GPS receiving means 100, when the user moves the GPS receiving device to a position where it is easy to receive the wave, the wave receiving operation is re-started (S200).

The walking distance of the user may be obtained in accordance with a frequency of the body movement signal obtained from the body movement detecting means 101 and time information obtained based upon the signal of the reference signal generating means 103 by setting the walking step length of the user in advance. The setting operation of the walking step length is performed by the input circuit 102 before starting the guide operation.

In the case where the user has tried to receive the wave during the interrupt of the wave receiving operation even if he or she does not reach the constant distance, this is judged that the user is not walking (S204), and the wave receiving operation is re-started. Accordingly, the user may confirm or correct the moving direction at any desired position.

Any desired constant distance through which the user has advanced may be registered by the input circuit 102 case by case at any time.

Incidentally, even if the wave receiving condition is good, it is possible to save the power consumption by intermittently receiving the GPS wave by setting the constant distance and time in advance.

When the user has been guided to the target position, or when the finish signal is inputted from the input circuit 102 (S208), the guide operation is completed.

Figure 12:
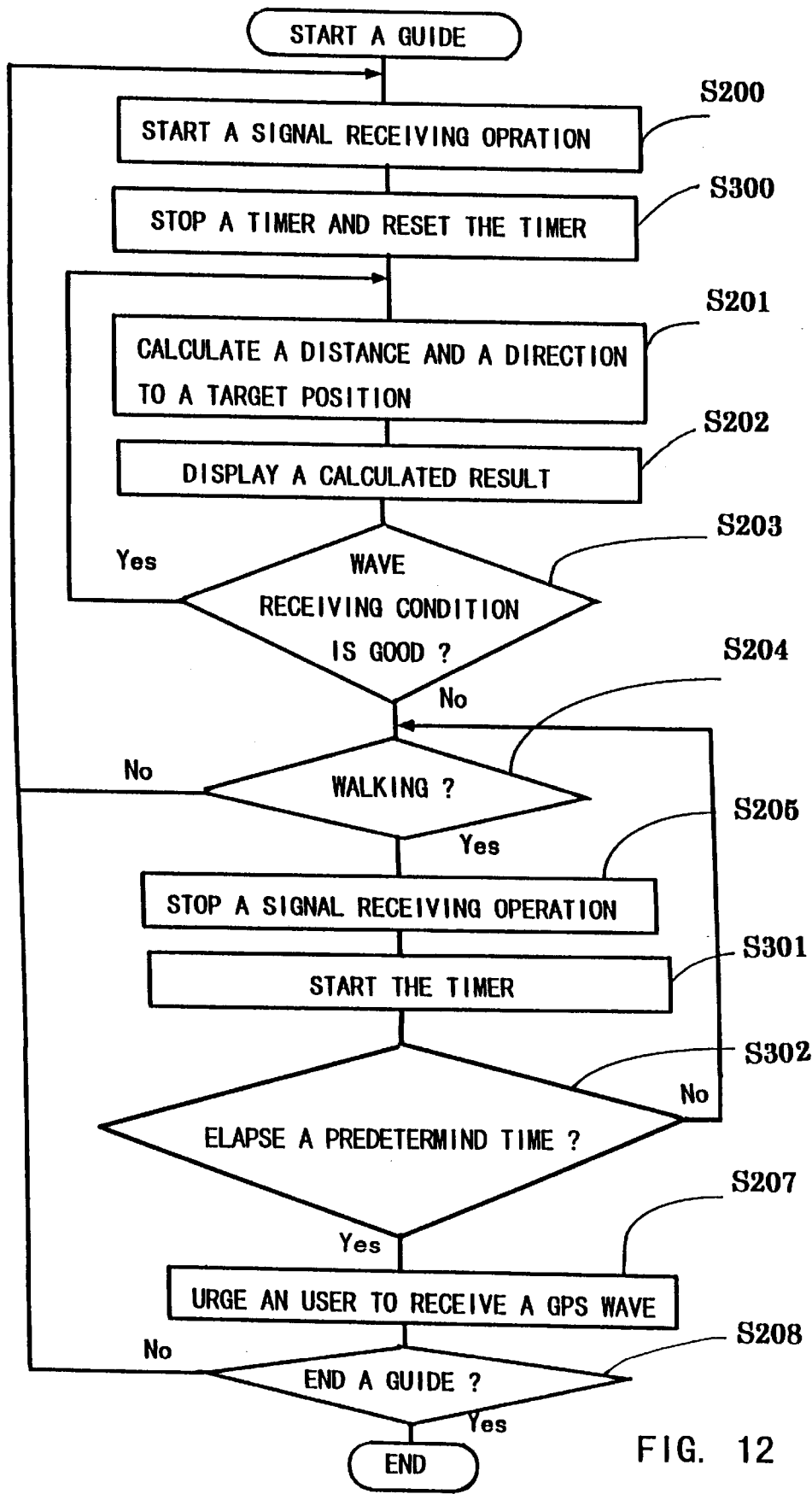
FIG. 12 is a flowchart showing a wrist watch type GPS receiver of another modification to the second embodiment of the invention.

The operation of a wrist watch type GPS receiver in accordance with a modification to the second embodiment of the invention will now be described with reference to FIG. 12. The main structure is common with that of the second embodiment. However, in this embodiment, a timing means is included for measuring time when the user is walking and the wave receiving operation is interrupted.

The difference from the embodiment described above in conjunction with FIG. 11 is that an interval from the time when the wave receiving operation is stopped to the time when the wave is again received is controlled by the period of time.

When the signal representative of the guide start is fed from the input circuit 102 to the CPU 104, the GPS receiving means 100 starts the wave receiving operation (S200). Next, the timer is stopped (in the case where the timer is already stopped, the stop of the timer should be confirmed), and the value of the timer is reset (S300). The result of the operation for seeking the distance and the direction to the target position (S201) is shown in the display panel 108 (S202), and the wave receiving condition is judged (S203). If the wave receiving condition is not good (S203), the same operation as that of the foregoing embodiment is performed until it is judged whether the user is walking or not (S204).

If the reason why the wave receiving condition is not good is that the user takes an action, the wave receiving operation is temporarily stopped (S205), and the timer is started (S301). When the user's action is continued and the timer reaches a predetermined value, since the moving direction should be confirmed or corrected, the alarm device 109 gives an alarm to urge the user to receive the GPS wave (S207). The period of time from the time when the wave receiving operation is stopped during the walk and the time when the wave is again received is registered by the input circuit 102 in advance.

In the same way as in the foregoing embodiment, even if the constant period of time has not lapsed during the interrupt of the wave receiving operation, in the case where the user has tried to receive the wave, it is judged that the condition is not the walking condition (S204), and the wave is again received. Accordingly, the user may confirm or correct the moving direction at any desired position. The above-described guide operation is repeated. When the user reaches the target position or the guide completion signal is fed from the input circuit 102 to the CPU 104 (S208), the guide operation is completed.

As described above, according to the present invention, since the system is composed of the antenna position detecting means for detecting the wave receiving posture of the GPS receiving antenna, the signal receiving operation controlling means for controlling the signal receiving operation on the basis of the output of the antenna posture detecting means, the GPS receiving means and the received GPS signal processing means controlled by the signal operation controlling means, and the display means for displaying the GPS data outputted from the GPS signal processing means, in the antenna position or posture where it is apparently impossible to receive the wave, it is possible to interrupt the operations of the GPS receiving operating section and the received signal processing section to attain the low power consumption (low current) for the GPS receiver. In accordance to another method, the body movement detecting means, the operation judgement means and the received signal controlling means are provided so that the signal receiving operation is interrupted in the posture where it is very difficult to receive the wave during the user's action to save the power consumption (low current). Also, the alarm means is provided so that the user is urged to receive the wave every time the user advances through a constant distance or every time a constant period of time has lapsed. Accordingly, when the user is moving toward the target position, it is advantageous that he or she may take a walk without normally paying any attention to the position of the GPS receiver.

What is claimed is:

1. A wrist watch type GPS receiver comprising:
   a GPS receiving antenna configured to be mounted to a user's wrist;
   antenna posture detecting means for detecting a signal receiving position of the GPS receiving antenna;
   signal receiving operation controlling means for controlling a signal receiving operation on the basis of an output of the of the antenna posture detection means;
   GPS receiving means for receiving a GPS signal by performing a signal receiving operation which is controlled on the basis of an output of the signal receiving operation controlling means;

received GPS wave processing means controlled on the basis of the output of the signal receiving operation controlling means for processing the output signal of the GPS receiving means; and GPS data display means for displaying GPS data output by the received GPS wave processing means;

wherein the signal receiving operation controlling means includes means for controlling the GPS receiving means not to receive a GPS signal when the output of the antenna posture detecting means indicates that the GPS receiving antenna is not capable of receiving the GPS signal.

2. A wrist watch type GPS receiver according to claim 1; further comprising timer means for counting a predetermined period of time; wherein the timer means is responsive to the antenna posture detecting means for counting the predetermined period of time in response to an output of the antenna posture detecting means indicating that the GPS signal cannot be received by the GPS receiving antenna, and the signal receiving operation controlling means is responsive to the timer means to wait until the predetermined period of time has elapsed to determine whether the GPS receiving antenna is capable of receiving the GPS signal, so that the GPS receiving operation is prevented for the predetermined period of time after detecting that the antenna cannot be received by the GPS receiving antenna.

3. A wrist watch type GPS receiver according to claim 1; further comprising alarm means for issuing an alarm indicating the completion of a GPS receiving operation.

4. A wrist watch type GPS receiver according to claim 1; wherein the GPS receiving antenna is configured to be disposed on a radius bone side of the user's wrist.

5. A wrist watch type GPS receiver comprising:

GPS receiving means for receiving a GPS signal;

body movement detecting means for detecting movement of the user's body;

judgment means for judging the movement of the user on the basis of an output signal of the body movement detecting means;

signal receiving operation controlling means for controlling a signal receiving operation of the GPS receiving means based on the judgment result of the judgment means;

moving distance calculating means for calculating a moving distance of the user on the basis of an output signal of the body movement detecting means during a period of time when the GPS signal receiving operation is interrupted; and alarm means for controlling the GPS receiving means to receive a GPS signal on the basis of an output signal of the moving distance calculating means and for producing an alarm to the user to indicate that the GPS receiving means is capable of receiving the GPS signal.

6. A wrist watch type GPS receiver according to claim 5; further comprising timer means for measuring a moving period of time for the user to move during the period of time when the GPS receiving means is prevented from receiving the wave.

7. A GPS receiver comprising: a GPS receiving antenna mountable to a movable support during use of the GPS receiver; a detecting circuit for detecting when the antenna is at a location at which it is capable of detecting a GPS signal; GPS receiving means for receiving the GPS signal; control means for monitoring an output of the detecting circuit and controlling the GPS receiving means to receive the GPS signal only when an output of the detecting circuit indicates that the antenna is capable of detecting the GPS signal; GPS processing means for processing an output signal of the GPS receiving means; and GPS data display means for displaying GPS data output by the received GPS wave processing means.

8. A GPS receiver according to claim 7; wherein the control means includes means for controlling the GPS processing means to process the output signal of the GPS receiving means only when the detecting circuit indicates that the antenna is capable of detecting the GPS signal.

9. A GPS receiver according to claim 7; further comprising a housing for mounting the detecting circuit, the GPS receiving means, the control means and the GPS processing means, the housing being wearable on a user's wrist.

10. A GPS receiver according to claim 7; further comprising timer means for counting a predetermined period of time, the timer means being responsive to the detecting circuit for counting the predetermined period of time in response to an output of the detecting circuit indicating that the GPS signal cannot be received by the antenna, and the control means being responsive to the timer means to wait until the predetermined period of time has elapsed to monitor the output of the detecting circuit to determine whether the antenna is capable of receiving the GPS signal, so that the GPS receiving operation is prevented for the predetermined period of time after detecting that the antenna cannot be received by the antenna.

11. A GPS receiver according to claim 10; wherein the control means, the GPS processing means and the timer means comprise a programmed CPU.

12. A GPS receiver according to claim 7; further comprising means for issuing an alarm indicating the completion of a GPS receiving operation.

13. A GPS receiver according to claim 7; wherein the GPS receiving antenna is configured to be mounted on a radius bone side of a user's wrist.

14. A GPS receiver according to claim 7; wherein the antenna is mountable on a user's body; and further comprising body movement detecting means for detecting movement of the user's body; movement judgment means for determining whether the movement of the user's body indicates walking or running on the basis of an output signal of the body movement detecting means; and moving distance calculating means for calculating a moving distance of the user on the basis of an output signal of the body movement detecting means during a period of time when the GPS signal receiving operation is interrupted; wherein the control means includes means for controlling the GPS receiving means to receive the GPS signal only when an output of the movement judgment means indicates that the user is not walking or running.

15. A GPS receiver according to claim 14; further comprising alarm means for producing an alarm on the basis of an output signal of the moving distance calculating means and an output signal of the detecting circuit for indicating that the antenna is capable of receiving the GPS signal.

16. A GPS receiver according to claim 15; further comprising timer means for measuring a time for the user to move during the period of time when the GPS receiving means is prevented from receiving the GPS signal.

17. A GPS receiver according to claim 7; further comprising display means for displaying at least one of position information and speed information based upon an output of the GPS signal receiving means.

* * * * *

UNITED STATES PATENT AND TRADEMARK OFFICE
CERTIFICATE OF CORRECTION

PATENT NO. : 5,905,460
DATED : May 18, 1999
INVENTOR(S) : ODAGIRI et al.

It is certified that error appears in the above-indentified patent and that said Letters Patent is hereby corrected as shown below:

In the heading, insert:

--Foreign Application Priority Data July 17, 1997

[JP] Japan...9-192795--.

Signed and Sealed this

Eighteenth Day of January, 2000

Attest:

Q. TODD DICKINSON

Attesting Officer     Commissioner of Patents and Trademarks